United States Patent
Tokuda et al.

(10) Patent No.: US 9,360,387 B2
(45) Date of Patent: Jun. 7, 2016

(54) PRESSURE SENSOR CHIP

(71) Applicant: Azbil Corporation, Tokyo (JP)

(72) Inventors: Tomohisa Tokuda, Tokyo (JP); Yuuki Seto, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 148 days.

(21) Appl. No.: 14/053,041

(22) Filed: Oct. 14, 2013

(65) Prior Publication Data

US 2014/0102208 A1    Apr. 17, 2014

(30) Foreign Application Priority Data

Oct. 15, 2012 (JP) ................. 2012-227640

(51) Int. Cl.
  *G01L 9/00* (2006.01)
  *G01L 13/02* (2006.01)
  *G01L 9/06* (2006.01)
(52) U.S. Cl.
  CPC ............. *G01L 9/0042* (2013.01); *G01L 13/026* (2013.01)
(58) Field of Classification Search
  CPC . G01L 9/0042; G01L 13/026; G01L 19/0023; G01L 19/0645; G01L 9/0075; A61M 1/3639; A61M 5/16854; A61B 5/0215
  USPC .................... 73/723, 715, 714, 724
  See application file for complete search history.

(56) References Cited

U.S. PATENT DOCUMENTS

| 7,360,431 | B2 | 4/2008 | Yoneda et al. |
| 8,312,775 | B2 | 11/2012 | Motoyama |
| 2006/0272422 | A1 | 12/2006 | Yoneda et al. |
| 2009/0308168 | A1 | 12/2009 | Motoyama |
| 2012/0017691 | A1* | 1/2012 | Ishihara et al. ................ 73/724 |
| 2013/0277772 | A1 | 10/2013 | Bryzek |

FOREIGN PATENT DOCUMENTS

| CN | 1034060 | 7/1989 |
| CN | 102589786 | 7/2012 |
| EP | 0 321 097 | 6/1989 |
| JP | H05-87664 | 4/1993 |
| JP | 06-26965 | 2/1994 |
| JP | 2002-340718 | 11/2002 |
| JP | 2005-069736 A | 3/2005 |
| WO | 2012/040211 | 3/2012 |

OTHER PUBLICATIONS

Chinese Office Action dated Mar. 30, 2015, which issued during prosecution of Chinese Application No. 201310479851.4, which corresponds to the present application.
Korean Office Action dated Sep. 30, 2014, which issued during prosecution of Korean Application No. 10-2013-0121742, which corresponds to the present application.

* cited by examiner

*Primary Examiner* — Harshad R Patel
*Assistant Examiner* — Brandi N Hopkins
(74) *Attorney, Agent, or Firm* — Troutman Sanders LLP (57) ABSTRACT

A pressure sensor chip is provided with first and second retaining members. The peripheral edge portions of the first and second retaining members are bonded to face one face and another face of a diaphragm, respectively. An inner edge of the peripheral edge portion of the first retaining member is positioned further to the outside than an inner edge of the peripheral edge portion of the second retaining member.

2 Claims, 7 Drawing Sheets

Background Art

FIG. 6

Background Art

FIG. 7

Background Art

PRESSURE SENSOR CHIP

CROSS REFERENCE TO RELATED APPLICATION

This application claims priority under 35 U.S.C. §119 to Japanese Patent Application No. 2012-227640, filed on Oct. 15, 2012, the entire content of which being hereby incorporated herein by reference.

FIELD OF TECHNOLOGY

The present invention relates to a pressure sensor chip provided with first and second retaining members having peripheral edge portions thereof that are provided to face one face and another face of a diaphragm and that are bonded thereto.

BACKGROUND

Conventionally, differential pressure transmitting devices that incorporate pressure sensor chips that use sensor diaphragms for outputting signals in accordance with pressure differences have been used as differential pressure transmitting devices for industrial use. These differential pressure transmitting devices are structured so as to guide the respective measurement pressures, which will act on high-pressure-side and low-pressure-side pressure bearing diaphragms, to one side face and the other side face of a sensor diaphragm, through a filling liquid as a pressure transmitting medium, so as to detect the deformation of the sensor diaphragm as, for example, a change in a resistance value of a strain resistance gauge, to convert this change in the resistance value into an electric signal, so as to be outputted to the outside.

This type of differential pressure transmitting device is used when measuring, for example, a liquid surface height through detecting a pressure difference between two locations, upper and lower, with in a sealed tank for storing a fluid that is to be measured, such as a high-temperature reaction tower in an oil refining plant.

Figure 5:
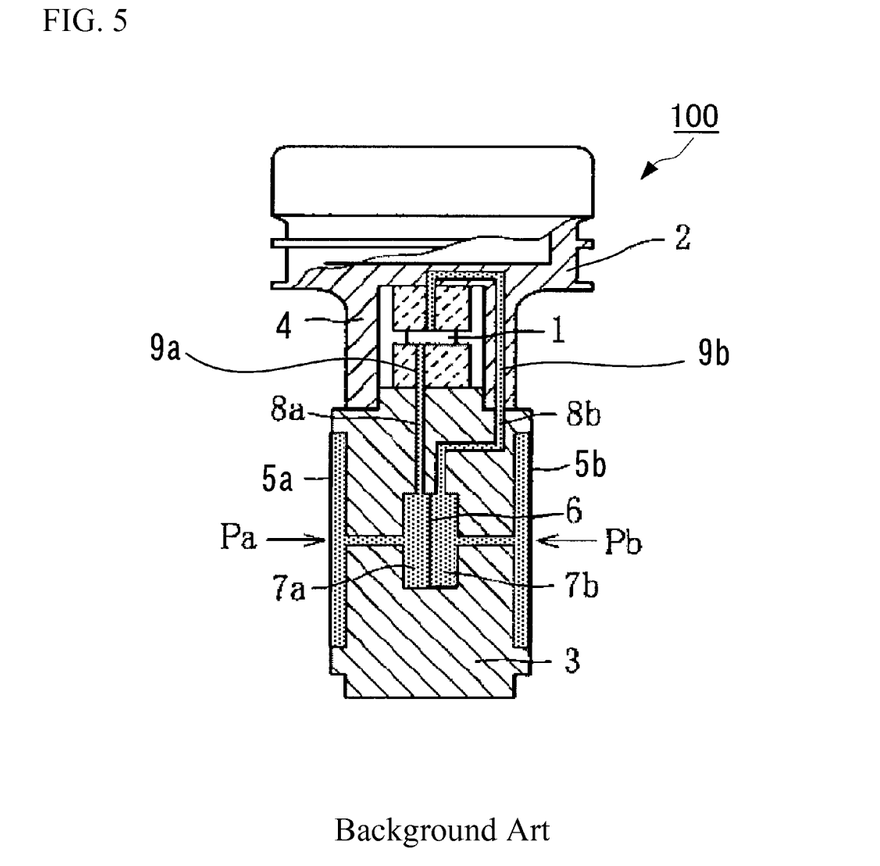
FIG. 5 is a diagram illustrating a schematic structure of a conventional differential pressure transmitting device.

FIG. 5 illustrates a schematic structure of a conventional differential pressure transmitting device. This differential pressure transmitting device 100 is structured through incorporating, in a meter body 2, a pressure sensor chip 1 having a sensor diaphragm (not shown). The sensor diaphragm in the pressure sensor chip 1 is made from silicon, glass, or the like, and a strain resistance gauge is formed on a surface of the diaphragm, which is formed in a thin plate shape. The meter body 2 is structured from a main unit portion 3, made out of metal, and a sensor portion 4, where a pair of barrier diaphragms (pressure bearing diaphragms) 5a and 5b, which are pressure bearing portions, is provided on a side face of the main unit portion 3, and the pressure sensor chip 1 is incorporated in the sensor portion 4.

In the meter body 2, the pressure sensor chip 1 that is incorporated in the sensor portion 4 is connected to the barrier diaphragms 5a and 5b that are provided in the main unit portion 3 through respective pressure buffering chambers 7a and 7b, which are separated by a large-diameter center diaphragm 6, and pressure transmitting media 9a and 9b, such as silicone oil, or the like, are filled into connecting ducts 8a and 8b, which connect the pressure sensor chip 1 to the barrier diaphragms 5a and 5b.

Note that the pressure transmitting medium, such as the silicone oil, is required because it is necessary to separate the strain (pressure)-sensitive sensor diaphragm from the corrosion-resistant pressure bearing diaphragms, in order to prevent foreign materials within the measurement medium from becoming adhered to the sensor diaphragm, and to prevent corrosion of the sensor diaphragm.

Figure 6:
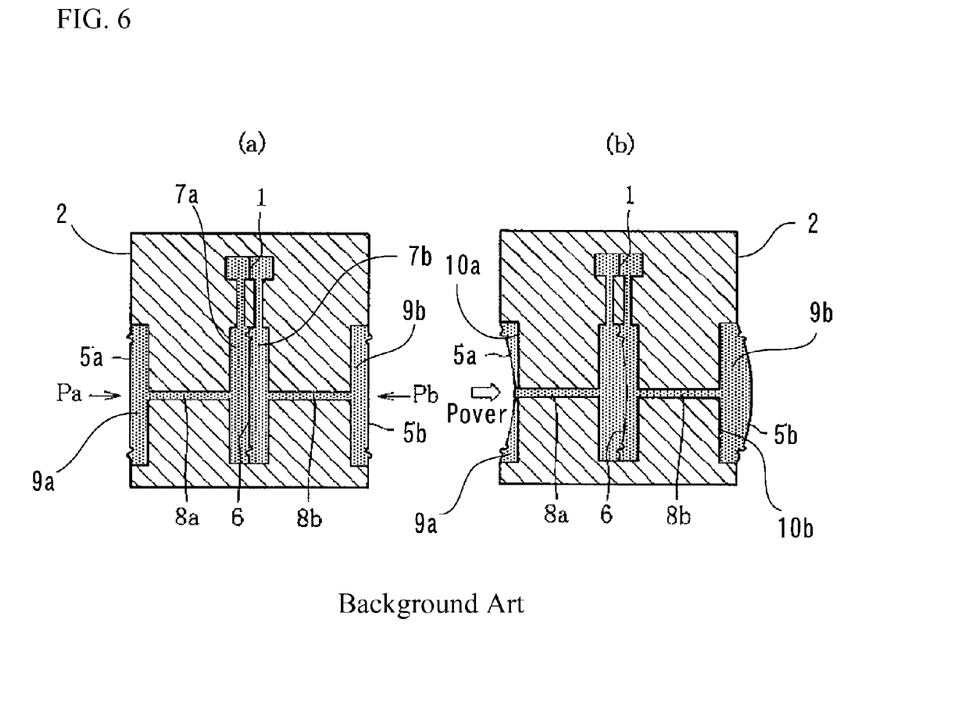
FIG. 6 is a diagram illustrating schematically a state of operation of this conventional differential pressure transmitting device.

In this differential pressure transmitting device 100, a first measurement pressure Pa from a process is applied to the barrier diaphragm 5a, and a second measurement pressure Pb, from the process, is applied to the barrier diaphragm 5b, as in the operating state during proper operation that is illustrated schematically in FIG. 6(a). As a result, the barrier diaphragms 5a and 5b undergo dislocation, and the pressures Pa and Pb that are applied thereto are directed to the first face and the other face of the sensor diaphragm of the pressure sensor chip 1, by the pressure transmitting media 9a and 9b, through pressure buffering chambers 7a and 7b that are divided by the center diaphragm 6. The result is that the sensor diaphragm of the pressure sensor chip 1 undergoes dislocation in accordance with the pressure differential ΔP between the pressures Pa and Pb that are directed thereto.

In contrast, if, for example, an excessively large pressure Pover is applied to the barrier diaphragm 5a, then, as illustrated in FIG. 6(b), the barrier diaphragm 5a undergoes a large dislocation, and the center diaphragm 6 undergoes dislocation in accordance therewith so as to absorb the excessively large pressure Pover. Given this, the barrier diaphragm 5a bottoms out on the bottom face (an excessive pressure guard face) of a recessed portion 10a of the meter body 2, controlling the dislocation thereof, and preventing the propagation of a greater differential pressure ΔP than that to the sensor diaphragm through the barrier diaphragm 5a. When an excessively large pressure Pover is applied to the barrier diaphragm 5b as well, as with the case wherein an excessively large pressure Pover is applied to the barrier diaphragm 5a, the barrier diaphragm 5b bottoms out on the bottom face (an excessive pressure guard face) of a recessed portion 10b of the meter body 2, controlling the dislocation thereof, and preventing the propagation of a greater differential pressure ΔP than that to the sensor diaphragm through the barrier diaphragm 5a. The result is that breakage of the pressure sensor chip 1, that is, breakage of the sensor diaphragm in the pressure sensor chip 1, due to the application of an excessively large pressure Pover is prevented in advance.

In this differential pressure transmitting device 100, the pressure sensor chip 1 is enclosed within the meter body 2, thus making it possible to protect the pressure sensor chip 1 from the outside corrosive environment, such as the process fluid. However, because the structure is one wherein the center diaphragm 6 and the recessed portions 10a and 10b are provided for controlling the dislocation of the barrier diaphragms 5a and 5b to protect the pressure sensor chip 1 from excessively large pressures Pover thereby, the dimensions thereof unavoidably must be increased.

Given this, there has been a proposal for a structure for preventing breakage/rupture of the sensor diaphragm through preventing excessive dislocation of the sensor diaphragm, when an excessively large pressure is applied, through the provision of a first stopper member and a second stopper member, as pressure sensor chip retaining members, and having recessed portions of the first stopper member and the second stopper member face the one face side and the other face side of the sensor diaphragm. See, for example, Japanese Unexamined Patent Application Publication 2005-69736 ("the JP '736").

Figure 7:
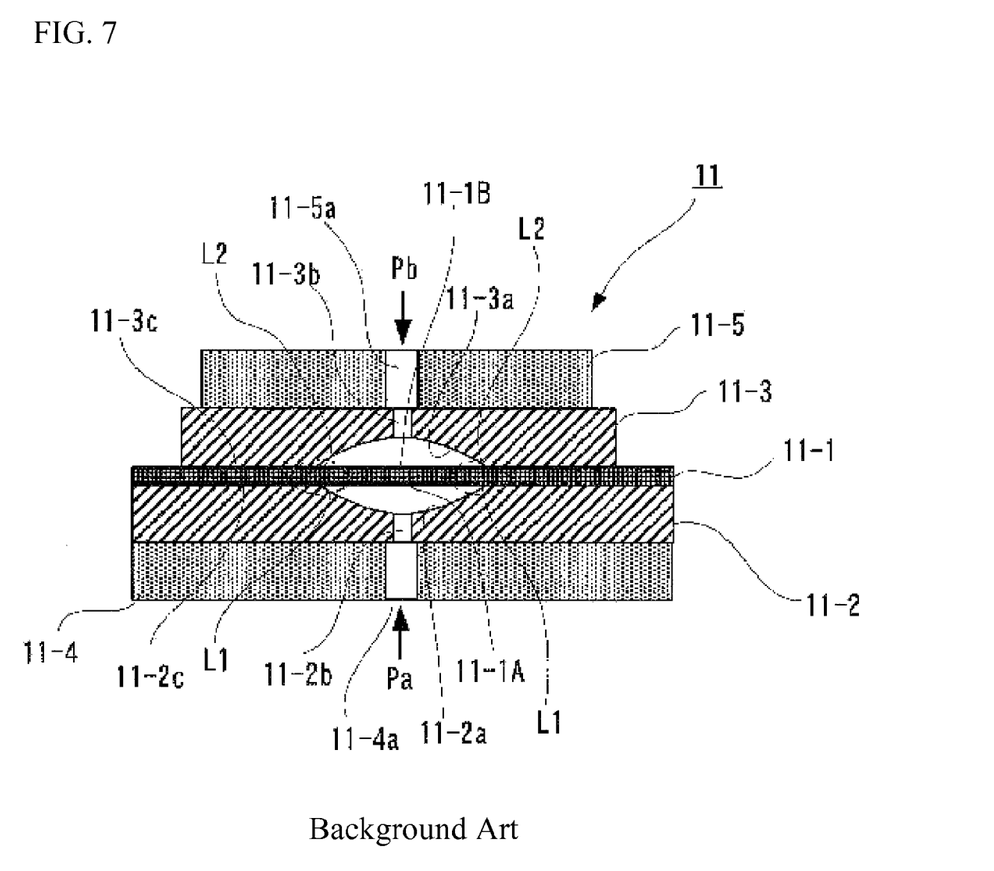
FIG. 7 is a diagram illustrating schematically a pressure sensor chip that uses the structure illustrated in the JP '736.

FIG. 7 illustrates schematically a pressure sensor chip that uses the structure illustrated in the JP '736. In this figure, 11-1 is a sensor diaphragm, 11-2 and 11-3 are first and second stopper members that are bonded with the sensor diaphragm 11-1 interposed therebetween, and 11-4 and 11-5 are pedestals to which the stopper members 11-2 and 11-3 are bonded. The stopper members 11-2 and 11-3 and the pedestals 11-4 and 11-5 are structured from silicon, glass, or the like.

In this pressure sensor chip 11, recessed portions 11-2a and 11-3a are formed in the stopper members 11-2 and 11-3, where the recessed portion 11-2a of the stopper member 11-2 faces the one face 11-1A of the sensor diaphragm 11-1, and the recessed portion 11-3a of the stopper member 11-3 faces the other face 11-1B of the sensor diaphragm 11-1. The recessed portions 11-2a and 11-3a have surfaces (aspherical surfaces) that are curved along the dislocation of the sensor diaphragm 11-1, where pressure introducing holes 11-2b and 11-3b are formed at the apex portions thereof. Pressure introducing holes 11-4a and 11-5a are formed in the pedestals 11-4 and 11-5 as well, at positions corresponding to those of the pressure introducing holes 11-2b and 11-3b of the stopper members 11-2 and 11-3.

When such a pressure sensor chip 11 is used, then when there is a displacement of the sensor diaphragm 11-1 when an excessively large pressure is applied to the one face 11-1A of the sensor diaphragm 11-1, the entirety of the dislocated face is supported and stopped by the curved surface of the recessed portion 11-3a of the stopper member 11-3. Moreover, then when there is a displacement of the sensor diaphragm 11-1 when an excessively large pressure is applied to the other face 11-1B of the sensor diaphragm 11-1, the entirety of the dislocated face is supported and stopped by the curved surface of the recessed portion 11-2a of the stopper member 11-2.

This effectively prevents accidental rupturing of the sensor diaphragm 11-1 due to the application of an excessively large pressure, through preventing excessive dislocation when an excessively large pressure is applied to the sensor diaphragm 11-1, by preventing a concentration of stresses on the peripheral edge portion of the sensor diaphragm 11-1, thus enabling an increase in the excessively large pressure guard operating pressure (withstand pressure). Moreover, in the structure illustrated in FIG. 5, the sensor diaphragm 6 and the pressure buffering chambers 7a and 7b are eliminated, and the measurement pressures Pa and Pb are guided directly from the barrier diaphragms 5a and 5b the sensor diaphragm 11-2, thus making it possible to achieve a reduction in the size of the meter body 2.

However, in the structure of the pressure sensor chip 11 illustrated in FIG. 7, the stopper members 11-2 and 11-3 are caused to face the peripheral edge portions 11-2c and 11-3c, and the positions of the inner edges L1 and L2 of the peripheral edge portions 11-2c and 11-3c are aligned and bonded to the one face 11-1A and the other face 11-1B of the sensor diaphragm 11-1.

That is, the peripheral edge portion 11-2c that surrounds the recessed portion 11-2a of the stopper member 11-2 is caused to face the one face 11-1A of the sensor diaphragm 11-1, and the peripheral edge portion 11-3c that surrounds the recessed portion 11-3a of the stopper member 11-3 is caused to face the other face 11-1B of the sensor diaphragm 11-1, and the positions of the inner edge L1 of the peripheral edge portion 11-2c of the stopper member 11-2 and of the inner edge L2 of the peripheral edge portion 11-3c of the stopper member 11-C are aligned and the stopper members 11-2 and 11-3 are bonded to the one face 11-1A and the other face 11-1B of the sensor diaphragm 11-1.

In the case of such a structure, there is a problem that when the sensor diaphragm 11-1 flexes due to the application of a pressure from one side, the vicinity of the edge (the position surrounded by the dotted line in FIG. 7) of the sensor diaphragm 11-1 on the side to which the pressure is applied, where the greatest tensile stress is produced, will be in a constrained state on both sides, thus causing a concentration of stress at that location, making it impossible to secure the expected withstand pressure.

The present invention was created in order to solve such a problem, and tan aspect thereof is to provide a pressure sensor chip able to secure the expected withstand pressure by reducing the stresses produced through constraining the diaphragm.

SUMMARY

In order to solve the problem set forth above, the present invention provides a pressure sensor chip provided with first and second retaining members wherein the peripheral edge portions thereof are provided to face and bonded to one face and another face of a diaphragm, respectively. An inner edge of the peripheral edge portion of the first retaining member is positioned further to the outside than an inner edge of the peripheral edge portion of the second retaining member.

In the present invention, when a high pressure is applied to one face of the diaphragm, the diaphragm is able to flex between the inner edge of the peripheral edge portion of the first retaining member and the inner edge of the peripheral edge portion of the second retaining member, without producing excessive tensile stress due to constraints, because the inner edge of the peripheral edge portion of the first retaining member is positioned so as to be further to the outside than the inner edge of the peripheral edge portion of the second retaining member, thus enabling a reduction in the stress that is produced at this part.

For example, when, in the present invention, the diaphragm is a sensor diaphragm (a diaphragm that outputs a signal in accordance with the differential pressure that is applied between one face and another face) and the face of the sensor diaphragm that will bear the high-pressure-side measurement pressure is determined reliably, then the one face of the sensor diaphragm is used as the pressure bearing face for the high-pressure-side measurement pressure, and the other face is used as the pressure bearing face for the low-pressure-side measurement pressure. That is, the one face of the sensor diaphragm is used as the pressure bearing face for the high-pressure-side measurement pressure, and the other face is used as the pressure bearing face for the low-pressure-side measurement pressure, and the inner edge of the peripheral edge portion of the first retaining member, which is bonded to the pressure bearing face for the high-pressure-side measurement pressure, is positioned to the outside of the inner edge of the peripheral edge portion of the second retaining member, which is bonded to the pressure bearing face for the low-pressure-side measurement pressure.

Although, when structured in this way, the second retaining member, which is bonded to the pressure bearing face for the low-pressure-side measurement pressure, may be a stopper member that is provided with a recessed portion for preventing excessive dislocation of the sensor diaphragm when an excessively large pressure is applied to the sensor diaphragm, such a recessed portion need not necessarily be provided, and thus the retaining member may be of a simplified shape that merely retains the sensor diaphragm.

Moreover, in the present invention, the structure may include first and second structural units, each structured from the diaphragm, the first retaining member, and the second retaining member. The structure may also include a sensor diaphragm wherein one face is a first face and another face is a second face. The sensor diaphragm outputs a signal in accordance with a difference in applied pressures between the first face and the second face. The sensor diaphragm is provided between the second retaining member of the first structural unit and the second retaining member of the second structural unit. A first pressure transmitting medium, which conveys, to the first face of the sensor diaphragm, a measurement pressure that is applied to one face of the diaphragm of the first structural unit, is filled into the second retaining member of the first structural unit. A second pressure transmitting medium, which conveys, to the second face of the sensor diaphragm, a measurement pressure that is applied to one face of the diaphragm of the second structural unit, is filled into the second retaining member of the second structural unit.

While, in this case, preferably the second retaining member of the first structural unit is provided as a stopper member having a recessed portion to prevent excessive dislocation of the diaphragm when an excessively large pressure is applied to the diaphragm of the first structural unit. The second retaining member of the second structural unit is provided as a stopper member having a recessed portion to prevent excessive dislocation of the diaphragm when an excessively large pressure is applied to the diaphragm of the second structural unit. Such recessed portions need not necessarily be provided, and the retaining members may be of simple shapes for merely retaining the sensor diaphragm.

In the present invention, in a pressure sensor chip provided with first and second retaining members wherein the peripheral edge portions thereof are provided to face and bonded to one first face and another face of a diaphragm, respectively, the inner edge of the peripheral edge portion of the first retaining member is positioned to the outside of the inner edge of the peripheral edge portion of the second retaining member, thus enabling a decrease in the stress that is produced through the constraint on the diaphragm, making it possible to secure the anticipated withstand pressure.

DETAILED DESCRIPTION

Examples according to the present invention will be explained below in detail, based on the drawings.

Example

Figure 1:
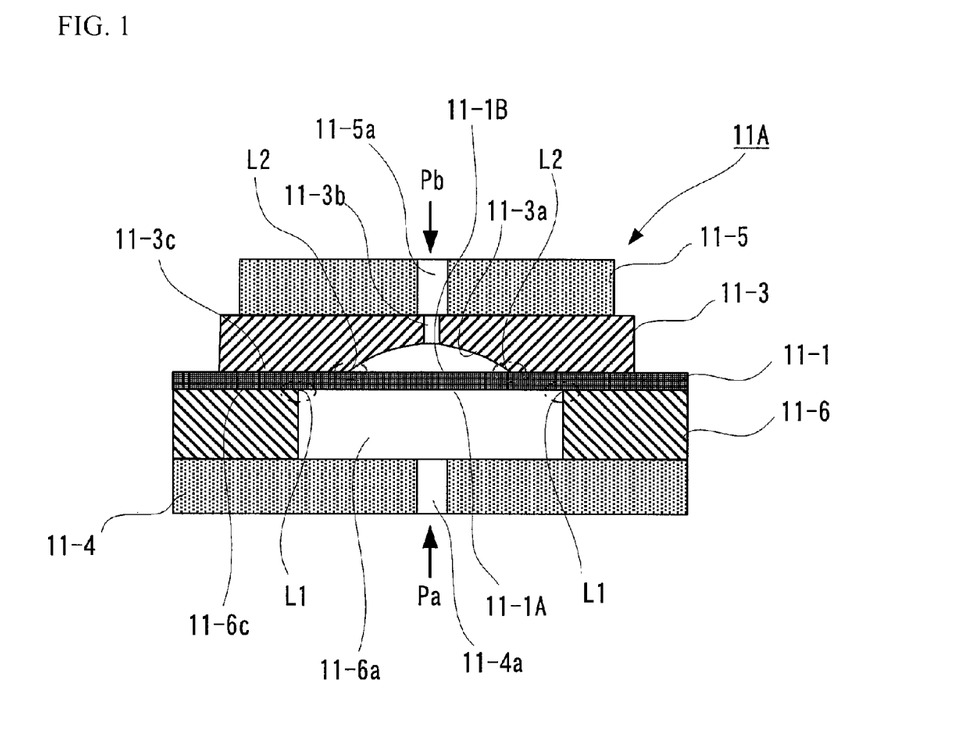
FIG. 1 is a diagram illustrating schematically Example of a pressure sensor chip according to the present invention.

FIG. 1 is a diagram illustrating schematically Example of a pressure sensor chip according to the present invention. In this figure, codes that are the same as those in FIG. 7 indicate identical or equivalent structural elements as the structural elements explained in reference to FIG. 7, and explanations thereof are omitted.

Note that, in the Example, the pressure sensor chip is indicated by the code 11A, to differentiate from the pressure sensor chip 11 illustrated in FIG. 7. Moreover, in the Example, it is assumed that the face of the sensor diaphragm 11-1 that will bear the high-pressure-side measurement pressure is determined reliably. In this example, the measurement pressure Pa is determined as the high-pressure-side measurement pressure, and the measurement pressure Pb is determined as the low-pressure-side measurement pressure.

In the pressure sensor chip 11A, the one face 11-1A of the sensor diaphragm 11-1 is the pressure bearing face for the high-pressure-side measurement pressure Pa, and the other face 11-1B of the sensor diaphragm 11-1 is the pressure bearing face for the low-pressure-side measurement pressure Pb.

Moreover, in the pressure sensor chip 11A, the structure is such that the stopper member 11-3 is provided for only the other face 11-1B of the sensor diaphragm 11-1, and a retaining member 11-6 of a simple shape is provided for the one face 11-1A of the sensor diaphragm 11-1.

That is, while the stopper member 11-3 has a recessed portion 11-3a that is a face that is curved along the dislocation of the sensor diaphragm 11-1, the retaining member 11-6 is not provided with such a recessed portion, and does not function as a member for guarding against an excessively high pressure. In the present example, the retaining member 11-6 is ring-shaped. Moreover, in the present example the retaining member 11-6 corresponds to the first retaining member in the present invention, and the stopper member 11-3 corresponds to the second retaining member in the present invention.

Furthermore, in the pressure sensor chip 11A, the inner edge L1 of the peripheral edge portion 11-6c of the retaining member 11-6 is positioned further to the outside than the inner edge L2 of the peripheral edge portion 11-3c of the stopper member 11-3. That is, the peripheral edge portion 11-6c that surrounds a hollow portion 11-6a of the retaining member 11-6 is provided to face the one face 11-1A of the sensor diaphragm 11-1, and the peripheral edge portion 11-3c that surrounds the recessed portion 11-3a of the stopper member 11-3 is provided to face the other face 11-1B of the sensor diaphragm 11-1, where the inner edge L1 of the peripheral edge portion 11-6c of the retaining member 11-6 is positioned further to the outside than the inner edge L2 of the peripheral edge portion 11-3c of the stopper member 11-3, and the retaining member 11-6 and the stopper member 11-3 are bonded to the one face 11-1A and the other face 11-1B of the sensor diaphragm 11-1.

With this pressure sensor chip 11A the measurement pressure Pa is determined reliably as the high-pressure-side measurement pressure, and thus the sensor diaphragm 11-1 flexes only to the side with the recessed portion 11-3a of the stopper member 11-3. In this case, the sensor diaphragm 11-1 is able to flex between the inner edge L1 of the peripheral edge portion 11-6c of the retaining member 11-6 (the support point for the diaphragm) and the inner edge L2 of the peripheral edge portion 11-3c of the stopper member 11-3 (the support point on the side to which the pressure is applied) without producing an excessive tensile stress due to being constrained, making it possible to reduce the stress that is produced at this part. Doing so enables a reduction in the stress that is produced due to the constraint on the sensor diaphragm 11-1, making it possible to secure the anticipated withstand pressure.

Another Example

While in the Example a stopper member 11-3 having a recessed portion 11-3a that has a face that is curved along the dislocation of the sensor diaphragm 11-1 is provided on the other face 11-1B of the sensor diaphragm 11-1 was provided as the retaining member, a retaining member of a simple shape which does not have such a recessed portion may be provided instead.

Figure 2:
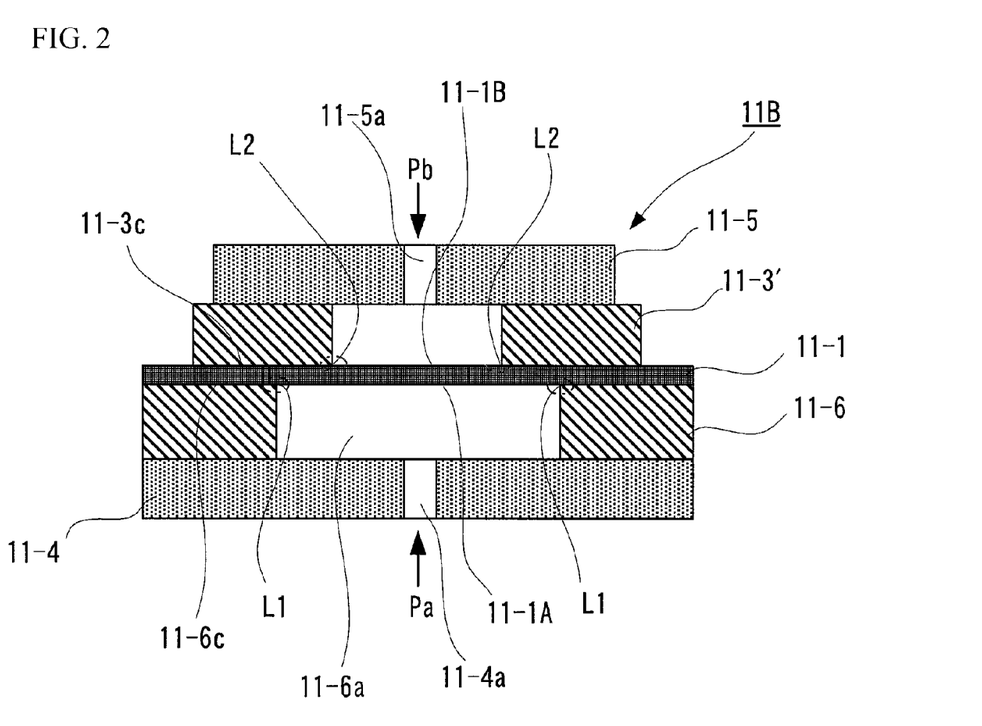
FIG. 2 is a diagram illustrating schematically Another Example of a pressure sensor chip according to the present invention.

FIG. 2 shows, as Another Example, an example wherein a retaining member 13-3' of a simple shape (a ring shape), identical to that of the retaining member 11-6, is provided instead of the stopper member 11-3. Even with the pressure sensor chip 11B according to the Another Example, as with the pressure sensor chip 11A of the Example, the inner edge L1 (the diaphragm supporting point) of the peripheral edge portion 11-6c of the retaining member 11-6 is located further to the outside than the inner edge L2 (the supporting point on the side to which the pressure is applied) of the peripheral edge portion 11-3c of the retaining member 11-3', thus enabling a reduction in the stress produced through constraining the sensor diaphragm 11-1.

Yet Another Example

Figure 3:
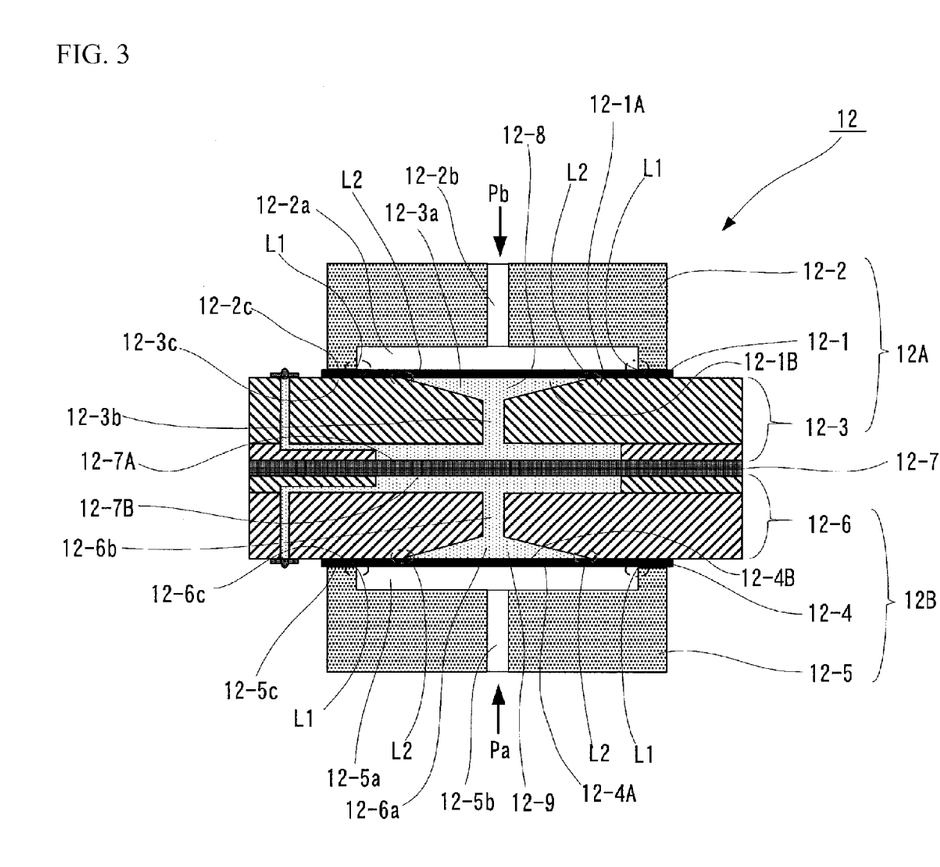
FIG. 3 is a diagram illustrating schematically Yet Another Example of a pressure sensor chip according to the present invention.

FIG. 3 is a diagram illustrating schematically Yet Another Example of a pressure sensor chip according to the present invention. Note that, in the Yet Another Example, the pressure sensor chip is indicated by the code 12, to differentiate from the pressure sensor chips 11A and 11B of the Example and Another Example. While in the Example and Another Example the face of the sensor diaphragm that bears the high-pressure-side measurement pressure is determined reliably, in the Yet Another Example the face of the sensor diaphragm that bears the high-pressure-side measurement pressure is not determined.

The pressure sensor chip 12 includes: a first structural unit 12A that is structured from a diaphragm (a barrier diaphragm) 12-1, a first retaining member 12-2, and a second retaining member 12-3; a second structural unit 12B that is structured from a diaphragm (a barrier diaphragm) 12-4, a first retaining member 12-5, and a second retaining member 12-6; and a sensor diaphragm 12-7.

In the first structural unit 12A, a recessed portion 12-2a is formed in the first retaining member 12-2 and a recessed portion 12-3a is formed in the second retaining member 12-3, where a peripheral edge portion 12-2c of the recessed portion 12-2a of the first retaining member 12-2 is provided to face one face 12-1A of the barrier diaphragm 12-1, and a peripheral edge portion 12-3c that surrounds the recessed portion 12-3a of the second retaining member 12-3 is provided to face the other face 12-1B of the barrier diaphragm 12-1, where an inner edge L1 of the peripheral edge portion 12-2c of the first retaining member 12-2 is positioned further to the outside than an inner edge L2 of the peripheral edge portion 12-3c of the second retaining member 12-3, and the first retaining member 12-2 and the second retaining member 12-3 are bonded to the one face 12-1A and the other face 12-1B of the barrier diaphragm 12-1.

Note that, in the second retaining member 12-3, the recessed portion 12-3a thereof has a tapered shape and functions as a member for preventing the application of an excessively large pressure to the barrier diaphragm 12-1, but in the first retaining member 12-2 the recessed portion 12-2a thereof does not have a tapered shape, and does not function as a member for preventing the application of an excessively large pressure to the barrier diaphragm 12-1. Moreover, a pressure introducing hole 12-2b is formed connected to the recessed portion 12-2a in the first retaining member 12-2, and a connecting duct 12-3b that connects to the recessed portion 12-3a is formed in the second retaining member 12-3. Note that the recessed portion 12-3a of the second retaining member 12-3 may instead be a curved face (an aspherical face) that is curved along the dislocation of the barrier diaphragm 12-1.

In the second structural unit 12B, a recessed portion 12-5a is formed in the first retaining member 12-5 and a recessed portion 12-6a is formed in the second retaining member 12-6, where a peripheral edge portion 12-5c of the recessed portion 12-5a of the first retaining member 12-5 is provided to face one face 12-4A of the barrier diaphragm 12-4, and a peripheral edge portion 12-6c that surrounds the recessed portion 12-6a of the second retaining member 12-6 is provided to face the other face 12-4B of the barrier diaphragm 12-4, where an inner edge L1 of the peripheral edge portion 12-5c of the first retaining member 12-5 is positioned further to the outside than an inner edge L2 of the peripheral edge portion 12-6c of the second retaining member 12-6, and the first retaining member 12-5 and the second retaining member 12-6 are bonded to the one face 12-4A and the other face 12-4B of the barrier diaphragm 12-4.

Note that, in the second retaining member 12-6, the recessed portion 12-6a thereof has a tapered shape and functions as a member for preventing the application of an excessively large pressure to the barrier diaphragm 12-4, but in the first retaining member 12-5 the recessed portion 12-5a thereof does not have a tapered shape, and does not function as a member for preventing the application of an excessively large pressure to the barrier diaphragm 12-4. Moreover, a pressure introducing hole 12-5b is formed connected to the recessed portion 12-5a in the first retaining member 12-5, and a connecting duct 12-6b that connects to the recessed portion 12-6a is formed in the second retaining member 12-6. Note that the recessed portion 12-6a of the second retaining member 12-6 may instead be a curved face (an aspherical face) that is curved along the dislocation of the barrier diaphragm 12-4.

In the pressure sensor chip 12, the sensor diaphragm 12-7 is provided between the second retaining member 12-3 of the first structural unit 12A and the second retaining member 12-6 of the second structural unit 12B. Moreover, a pressure transmitting medium (a first pressure transmitting medium) 12-8 for transmitting, to the one face (a first face) 12-7A of the sensor diaphragm 12-7, the measurement pressure Pb that is applied to the one face 12-1A of the barrier diaphragm 12-1 of the first structural unit 12A, is filled into the recessed portion 12-3a of the second retaining member 12-3 and the connecting duct 12-3b of the first structural unit 12A, and a pressure transmitting medium (a second pressure transmitting medium) 12-9 for transmitting, to the one face (a second face) 12-7B of the sensor diaphragm 12-7, the measurement pressure Pb that is applied to the one face 12-4A of the barrier diaphragm 12-4 of the second structural unit 12B, is filled into the recessed portion 12-6a of the second retaining member 12-6 and the connecting duct 12-6b of the second structural unit 12B.

In this pressure sensor chip 12, when the measurement pressure Pa is used as the high-pressure-side measurement pressure and the measurement pressure Pb is used as the low-pressure-side measurement pressure, then when the high-pressure-side measurement pressure Pa is applied to the one face 12-4A of the barrier diaphragm 12-4, the barrier diaphragm 12-4 is able to flex between the inner edge L1 of the peripheral edge portion 12-5c of the first retaining member 12-5 (the support point for the diaphragm) and the inner edge L2 of the peripheral edge portion 12-6c of the second support member 12-6 (the support point on the side to which the pressure is applied) without producing an excessive tensile stress due to being constrained, making it possible to reduce the stress that is produced at this part.

Moreover, in this pressure sensor chip 12, when the measurement pressure Pb is used as the high-pressure-side measurement pressure and the measurement pressure Pb is used as the low-pressure-side measurement pressure, then when the high-pressure-side measurement pressure Pb is applied to the one face 12-1A of the barrier diaphragm 12-1, the barrier diaphragm 12-1 is able to flex between the inner edge L1 of the peripheral edge portion 12-2c of the first retaining member 12-2 (the support point for the diaphragm) and the inner edge L2 of the peripheral edge portion 12-3c of the second support member 12-3 (the support point on the side to which the pressure is applied) without producing an excessive tensile stress due to being constrained, making it possible to reduce the stress that is produced at this part.

In this way, the pressure sensor chip according to the Yet Another Example reduces the stress that is produced through the constraints on the barrier diaphragms 12-1 and 12-4, making it possible to secure the anticipated withstand pressure.

Further Example

While in the Yet Another Example, a second retaining member 12-3 that has a tapered recessed portion 12-3a was provided for the other face 12-1B of the barrier diaphragm 12-1, and a second retaining member 12-6 that has a tapered recessed portion 12-6a was provided for the other face 12-4B of the barrier diaphragm 12-4, retaining members with simple shapes, which do not have the recessed portions shaped as described above, may be provided instead.

Figure 4:
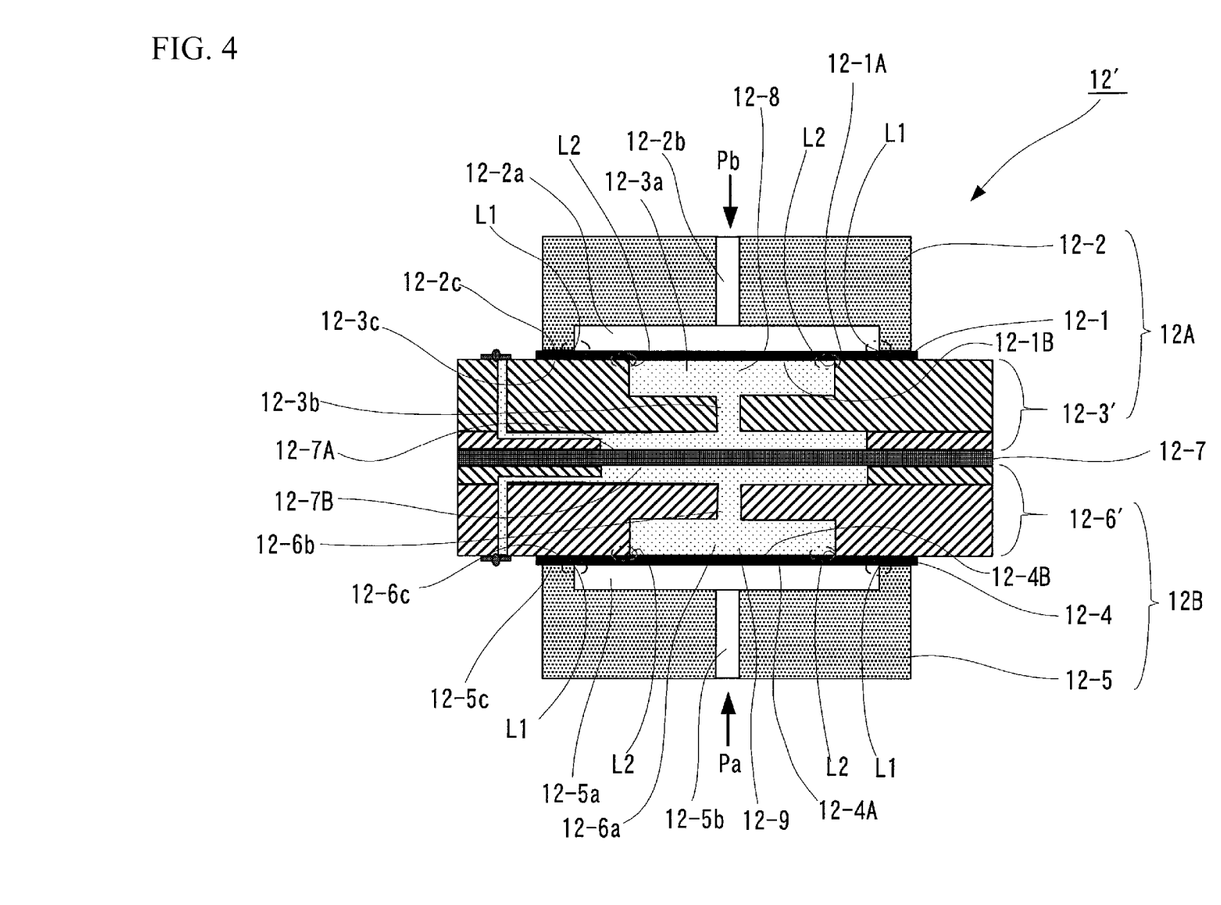
FIG. 4 is a diagram illustrating schematically Further Example of a pressure sensor chip according to the present invention.

FIG. 4 shows an example wherein, instead of the second retaining members 12-3 and 12-6, second retaining members 12-3' and 12-6' having the same simple shape as the first retaining members 12-2 and 12-5 are provided is shown as Further Example. Even with the pressure sensor chip 12' according to the Further Example, as with the pressure sensor chip 12 of the Yet Another Example, the inner edges L1 (the diaphragm supporting points) of the peripheral edge portions 12-2c and 12-5c of the first retaining members 12-2 and 12-5 are located further to the outside than the inner edges L2 (the supporting points on the sides to which the pressures are applied) of the peripheral edge portions 12-3c and 12-6c of the second retaining members 12-3c and 12-6c, thus enabling a reduction in the stresses produced through constraining the sensor diaphragms 12-1 and 12-4.

Note that while in the examples set forth above the sensor diaphragm was of a type wherein a strain resistance gauge was formed wherein there is a change in resistance value in accordance with the change in pressure, the sensor chip may be of an electrostatic capacitance type instead. An electrostatic capacitance sensor chip includes a substrate that is provided with a specific space (a capacitance chamber), a diaphragm that is provided on the space of the substrate, a stationary electrode that is formed on the substrate, and a movable electrode that is formed on the diaphragm. When the diaphragm deforms due to the application of pressure, the distance between the movable electrode and the stationary electrode changes, causing a change in the electrostatic capacitance over that space.

Moreover, in the various examples set forth above the amount of positional offsets between the diaphragm support points and the support points on the sides wherein the pressure is applied are determined in consideration of various attributes that must be satisfied by the sensor (withstand pressure, size, accuracy, sensitivity, and the like). While increasing the amount of positional offset between the diaphragm supporting points and the points for supporting on the side on which the pressure is applied can increase the stress mitigating effect and thus increase the ability to withstand pressure, on the other hand, it may increase the size of the pressure and produce constraints in manufacturing. Consequently, it is important to determine the amount of positional offset between the diaphragm support points and the support points on the side to which the pressure is applied so as to be in a range wherein the various attributes of the sensor are satisfactory.

Extended Examples

While the present invention has been explained above in reference to the examples, the present invention is not limited to the examples set forth above. The structures and details in the present invention may be varied in a variety of ways, as can be understood by one skilled in the art, within the scope of technology in the present invention. Moreover, the present invention may be embodied through combining the various examples, insofar as there are no contradictions.

The invention claimed is:
1. A pressure sensor chip comprising:
 a sensor diaphragm for outputting a signal in accordance with a difference in applied pressures between a first face and a second face, wherein the second face is opposite the first face;
 a first retaining member comprising a first peripheral edge portion bonded to the first face of the sensor diaphragm; and
 a second retaining member disposed on the second face of the diaphragm, comprising a second peripheral edge portion bonded to the second face of the diaphragm;
 wherein an inner edge of the first peripheral edge portion of the first retaining member is positioned further to the outside than an inner edge of the second peripheral edge portion of the second retaining member.
2. The pressure sensor chip as set forth in claim 1, wherein the second retaining member is provided with a recessed portion for preventing excessive dislocation of the sensor diaphragm when an excessively large pressure is applied to the sensor diaphragm.

* * * * *